United States Patent [19]

Yoshida et al.

[11] Patent Number: 4,907,091
[45] Date of Patent: Mar. 6, 1990

[54] OPTICAL READING APPARATUS
[75] Inventors: Shuji Yoshida; Suminori Tateishi; Tomoyoshi Furusawa, all of Tokyo, Japan
[73] Assignee: Kabushiki Kaisha Toshiba, Kanagawa, Japan
[21] Appl. No.: 228,194
[22] Filed: Aug. 4, 1988
[30] Foreign Application Priority Data
  Aug. 6, 1987 [JP]  Japan ............... 62-119832[U]
[51] Int. Cl.$^4$ .................................. H04N 1/04
[52] U.S. Cl. ...................... 358/474; 358/213.13; 358/213.19; 250/237 R; 250/208.1
[58] Field of Search ............ 358/285, 280, 293, 282, 358/213.13, 213.19, 225; 350/448, 438, 439; 250/578

[56] References Cited
U.S. PATENT DOCUMENTS 3,546,378 12/1970 Karikawa ..................... 358/225
4,003,636 1/1977 Goshima ...................... 350/448
4,614,976 9/1986 Ogata ......................... 358/257
4,620,234 10/1986 Watanabe ..................... 358/285
4,644,159 2/1987 Miura ......................... 250/578
4,677,495 6/1987 Ito ........................... 358/285
4,710,620 12/1987 Kunkel ...................... 250/203 R
4,757,387 7/1988 Saito ....................... 358/213.13
4,812,911 3/1989 Ohshima .................... 358/213.13
4,812,913 3/1989 Knop ......................... 358/285

FOREIGN PATENT DOCUMENTS

2183120 5/1987 United Kingdom .

Primary Examiner—James J. Groody
Assistant Examiner—Jerome Grant, II
Attorney, Agent, or Firm—Finnegan, Henderson, Farabow, Garrett and Dunner

[57] ABSTRACT

An optical reading apparatus for a facsimile device in which a reading unit has a shading plate. The shading plate is arranged such that it can move in a direction inclined at angle $\theta$ ($\theta < 90°$) to the light path of the reading apparatus.

16 Claims, 6 Drawing Sheets

OPTICAL READING APPARATUS

BACKGROUND OF THE INVENTION

The present invention relates to an optical reading apparatus having a shading plate for reducing the difference in amount between the light passing through the central portion of a focusing lens and the light passing through the peripheral portion of the lens.

Figure 1:
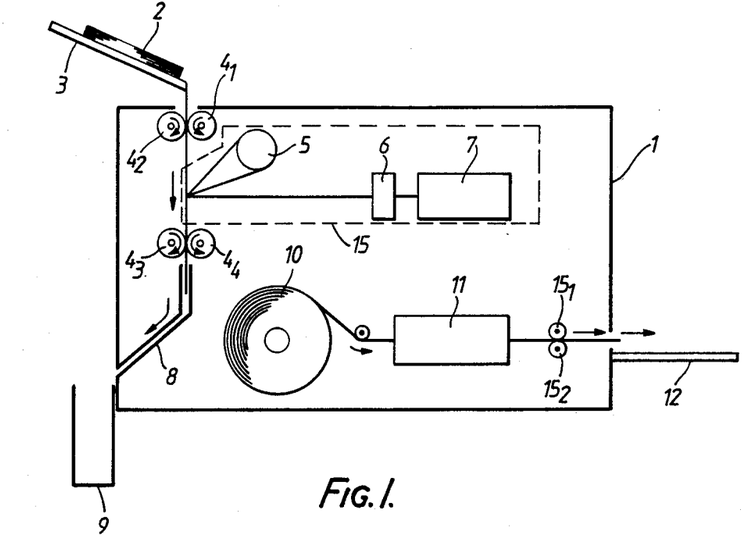
FIG. 1 is a schematic representation of a typical conventional facsimile device.

FIG. 1 schematically shows a facsimile device 1, a typical device in which an optical reading apparatus is used. As is shown in this figure, facsimile device 1 comprises sheet table 3, feed rollers 4 reading section 14 (including lamp 5, lens 6, and reading apparatus 7), sheet-transporting path 8, sheet stacker 9, printer 11, paper-receiving table 12, receiver 14, and feed rollers 15. A roll of recording paper 10 is set in a housing of facsimile device 1.

In operation, sheet 2 (i.e., an original) is placed on table 3. Feed rollers 4 which contact each other, are rotated, thereby feeding sheet 2 from table 3 into the housing of device 1. Lamp 5 is turned on, thus applying light to that side of sheet 2 on which a pattern image is formed. The light reflected from this side of sheet 2 is supplied through lens 6 to reading apparatus 7. Thus, the reading section 14 reads the pattern image from sheet 2, and converts the image into electric signals.

The electric signals, or facsimile signals, are transmitted from a transmitter (not shown) provided within the housing, to a receiving facsimile device which is identical in structure with facsimile device 1. After sheet 2 has been exposed to the light emitted from lamp 5, it is fed by feed rollers 4 and transported through path 8 into sheet stacker 9.

Receiver 14 of the receiving facsimile device receives the facsimile signals sent from device 1. The signals are supplied to printer 11. Printer 11 converts the signals into a pattern image, and prints this image on recording paper 10 fed out of the roll. That part of paper 10 on which the image has been printed is cut and fed by feed rollers 15.

Figure 2:
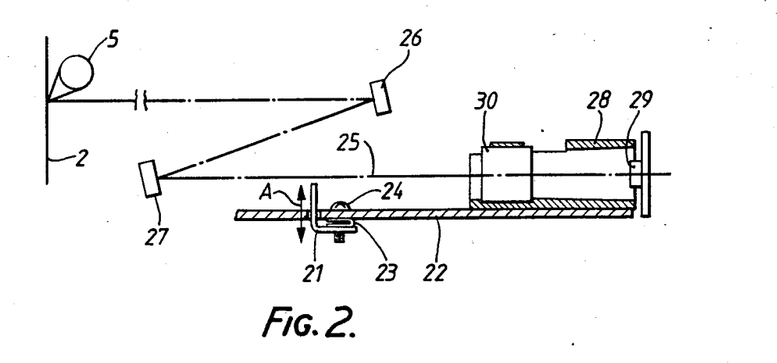
FIG. 2 is a diagram showing, in detail, the conventional optical reading apparatus incorporated in the facsimile device shown in FIG. 1.

Reading apparatus 7 will be described in detail, with reference to FIG. 2. As is illustrated in FIG. 2, apparatus 7 comprises shading plate 21 and base 22. Plate 21 is fastened to base 22 by means of screw 24, with a leaf spring 23 interposed between plate 21 and base 22. When screw 24 is turned in either direction, shading plate 21 is moved in the direction of arrow A, that is, in the direction perpendicular to light path 25 of the reading apparatus 7. Apparatus 7 further comprises mirrors 26 and 27, lens mount 28, sensor 29, and lens 30. Lens mount 28 is set on base 22 and holds lens 30. Sensor 29 is located at the rear of lens mount 28.

The light emitted from lamp 6 is applied to sheet 2 (i.e., an original) on which a pattern image is formed. The light is reflected from sheet 2, and is supplied to mirror 26. Mirror 26 reflects the light and applies it to mirror 27. Mirror 27 reflects the light and applies it to lens 30 in light path 25. Lens 30 focuses the light, thereby projecting the pattern image onto the light-receiving surface of sensor 29.

Figure 3:
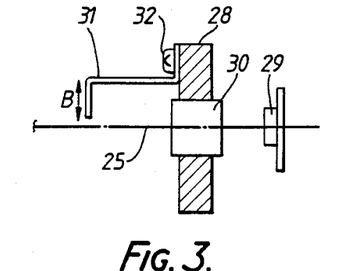
FIG. 3 is a diagram illustrating another conventional optical reading device.

Another conventional reading apparatus will be described, with reference to FIG. 3. As is shown in FIG. 3, this reading apparatus comprises shading plate 31, lens mount 28, screw 32, sensor 29, and lens 30. The shading plate 31 is directly attached to lens mount 28 by screw 32 which passes through an elongated hole made in shading plate 31. The axis of the elongated hole extends perpendicular to light path 25 of the reading section. To adjust the position of shading plate 31, screw 32 is turned in one direction and is thus loosened. Then, plate 31 is moved in the direction of arrow B, that is, in the direction perpendicular to light path 25. Finally, screw 32 is turned in the opposite direction, thus fastening plate 31 to lens mount 28. As a result, plate 33 is fixed at an optimum position. The light reflected from the sheet (not shown) is applied in path 25 to lens 30. Lens 30 focuses the light, thereby projecting the pattern image, which is formed on the sheet, onto the light-receiving surface of sensor 29.

In the reading section shown in FIG. 2, shading plate 1 is attached to base 22 by screw 24, with leaf spring 23 interposed between plate 21 and base 22. Due to the force which spring 23 exerts on screw 24, screw 24 is likely to turn loose. To secure screw 24, thereby to prevent the loosening of screw 24, a nut must be used. However, the use of the nut not only increases the number of parts forming the reading section, but also renders it difficult to adjust the position of shading plate 21.

In the reading apparatus illustrated in FIG. 3, shading plate 21 is attached to the front of lens mount 28 by screw 32 which passes through the elongated hole of plate 31. Hence, to adjust the position of plate 31, a screw driver must be positioned in front of the reading section, it is difficult to use a screw driver thus positioned. Consequently, it is difficult and time-consuming to adjust acutely the position of plate 31.

Either known reading section is considered disadvantageous in the following respect. Since the shading plate is moved perpendicular to the light path and toward the light path, thereby to reduce the amount of the light passing through the central portion of the lens, the amount of light passing through the peripheral portion of the lens is inevitably reduced, though it should not be reduced.

Figure 4:
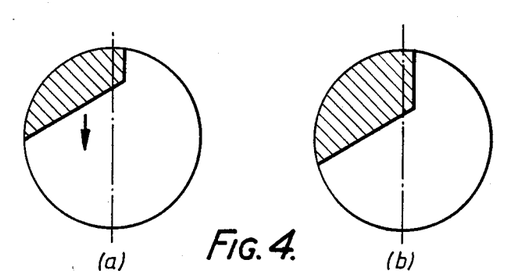
FIGS. 4(a) and 4(b) show different positional relationships between shading plates and the lenses, used in the convention reading apparatus.

More specifically, FIGS. 4(a) and 4(b) show different positional relationships between the shading plate (21, 31) and the lens 30. As is evident from these figures, when the shading plate is moved toward the axis of the light path, that is, from the position shown in FIG. 4(a) to the position shown in FIG. 4(b), in order to reduce the amonut of light incident on the lens, it will cover a greater peripheral portion of the lens. Obviously, the closer the plate is to the axis of the light path, the lens light will pass through the peripheral portion of the lens.

Figure 5:
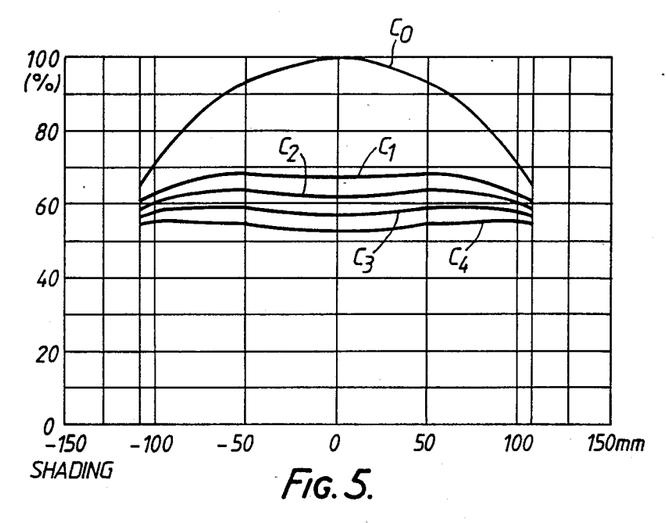
FIG. 5 is a graph showing the shading characteristics of the conventional reading apparatus.

FIG. 5 is a graph showing the characteristics of the shading achieved in the conventional reading apparatus. It represents the light distribution in percentage along the diameter of the lens (which corresponds to the width of sheet 2, i.e., the original). The distance from the center of the lens is plotted on the X axis, whereas the percentage of light is plotted on the Y axis. The amount of the light, which is applied to the center of the lens when the shading plate is outside the optical path (5, 16), is rated as maximum, i.e., 100%.

Curve $C_0$ shown in FIG. 5 represents the distribution of light which is applied to the lens when no shading is performed. Curves $c_1$, $c_2$, $c_3$, and $c_4$ indicate how the distribution of light changes as the shading plate (21, 31) is moved deeper into the light path 25. As these curves demonstrate, when the light incident on the center portion of the lens is reduced, the light incident on the periphery portion of the lens is also reduced.

SUMMARY OF THE INVENTION

It is accordingly an object of the present invention to provide an optical reading apparatus which has shading plate with a simple structure which can be easily and correctly positioned.

Another object of the present invention is to provide an optical reading apparatus, where in light shaded such that the light incident on the center portion of the lens is reduced without reducing the light applied to the peripheral portion of the lens.

To accomplish these objects, according to this invention, the shading plate is arranged such that it can move in a direction inclined an angle $\theta$ ($\Theta < 90°$) to the light path of the reading apparatus. Thus, the plate can protrude into the path for a distance shorter than the distance it is moved. Hence, the position of the plate can be minutely or finely adjusted wiht respect to the light path.

Further, since the shading plate is inclined to the optical path, its apparent width decreases as it protrudes further into the light path. As a result, a sufficient amount of light is applied to the peripheral portions of the lens.

DESCRIPTION OF THE PREFERRED EMBODIMENTS

An embodiment of the present invention will now be described, with reference to the accompanying drawings.

Figure 6:
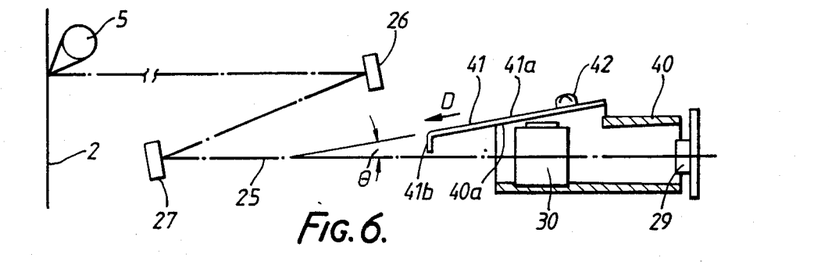
FIG. 6 is a side view schematically illustrating an optical apparatus according to the present invention.
Figure 7:
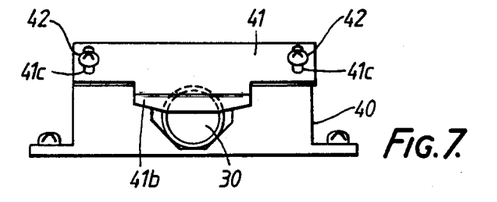
FIG. 7 is a front view showing some main components of the optical reading apparatus shown in FIG. 6.
Figure 8:
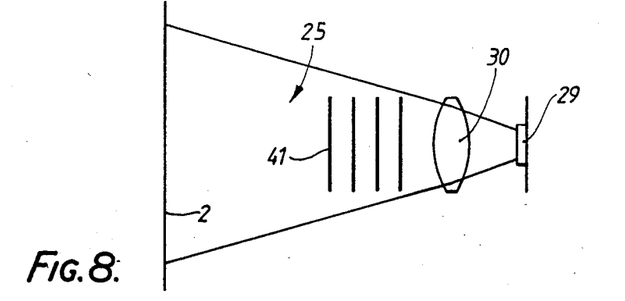
FIG. 8 is a plan view illustrating the positional relationship between the shading plate and the optical path of the reading apparatus shown in FIG. 6.

FIG. 6 is a side view schematically illustrating an optical apparatus according to the present invention, and FIG. 7 is a front view showing some main components of the optical reading apparatus shown in FIG. 6. As is shown in these figures, the optical reading apparatus comprises lens mount 40, shading plate 41, lens 30, and sensor 29. Lens mount 40 has an upper surface 40a inclined at 10° to a light path 25 to the reading apparatus. Shading plate 41 consists of two portions, a long portion 41a and vertical portion 41b.

The long portion 41a has an elongated hole 41c. Long portion 41a is fastened to the upper surface 40a of lens mount 40 by means of a screw 42 passing through hole 41c, and is, therefore, inclined at 10° to light path 25. Vertical portion 41b is located near light path 25 of the reading apparatus. The long portion 41a of plate 41 is, therefore, inclined at an angle $\theta$ to light path 25. Vertical portion 41b is shaped to perform shading such that the light incident on the center portion of lens 30 is reduced more than the light applied to the peripheral portion of lens 30.

Lens 30 and sensor 29 are mounted and fixed on lens mount 40. The light reflected from sheet 2 (i.e., an original) is applied to mirror 26 and reflected therefrom to mirror 27. Mirror 27 reflects and applies the light to the optical reading apparatus. In the optical reading apparatus, the light travels along light path 25 and undergoes the shading performed by vertical portion 41b of shading plate 41. The light is then applied through lens 30 onto the light-receiving surface of sensor 29.

In order to shade the light to be applied to the center portion of lens 30 more than the light to be applied to the peripheral portion of lens 30, screw 42 is first loosened. Then shading plate 41 is moved in the direction of arrow D (FIG. 6) to a desired position, and screw 42 is retightened, thus fastened plate 41 to lens mount 40.

The longer the distance the plate is moved in the direction of arrow D, the nearer the vertical portion 41b approaches or intercepts light path 25 to shade the light. Since vertical portion 41b moves away from lens 30 toward mirror 27, the ratio of its width to the width of path 25 which converges toward lens 30 decreases. As a result, the positional relationship between portion 41b and lens 30 changes from the one shown in FIG. 9(a) to the one shown in FIG. 9(b).

Figure 9:
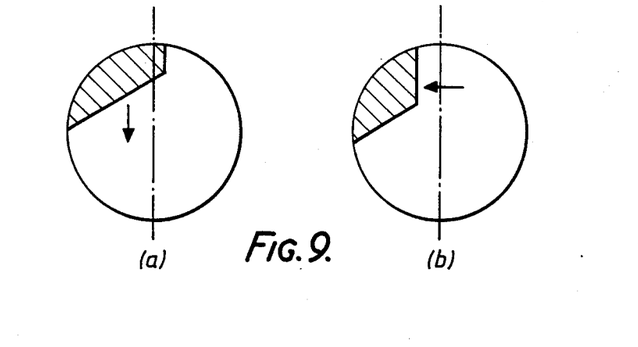
FIGS. 9(a) and 9(b) show different positional relationships between the shading plate and the lens, both used in the reading apparatus shown in FIG. 6.

As is evident from FIGS. 9(a) and 9(b), the area of the lens surface, which is covered by portion 41a of shading plate 41, remains almost the same. This is because, although portion 41a moves down, it also recedes to the left.

Figure 10:
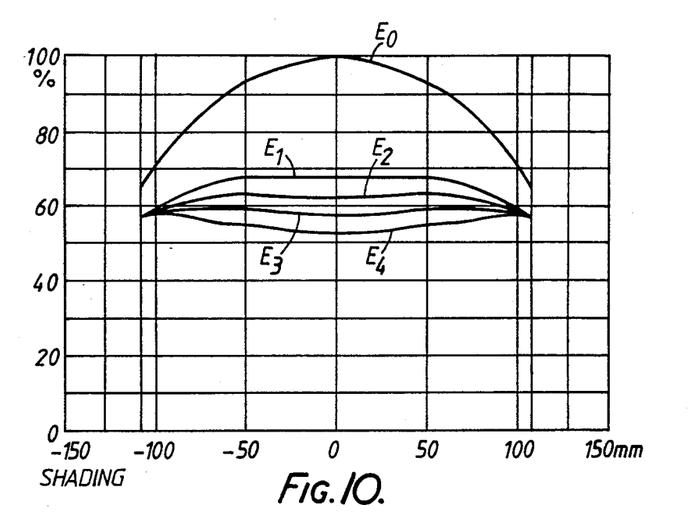
FIG. 10 is a graph showing the shading characteristics of the optical reading apparatus according to the invention.

FIG. 10 is a graph showing the shading characteristics of the reading apparatus shown in FIG. 6, in which shading plate 41 is inclined at 10° to light path 25. More precisely, the graph represents the light distribution along the diameter of the lens 30, in percentage. The amount of light which is applied to the center of the lens when plate 41 does not shade any of the light reflected from mirror 27, is rated as maximum, i.e. 100%.

Curve $E_0$ shown in FIG. 5 represents the distribution of light which is applied to the lens when no shading is performed. Curves $E_1$, $E_2$, $E_3$, and $E_4$ indicate how the distribution of light changes as shading plate 41 is moved deeper into the light path 25. As these curves demonstrate, only the light incident on the center portion of lens 30 is reduced, and the amount of the light applied to the peripheral portion of lens 30 remains almost unchanged.

In the embodiment described above, shading plate 41 is fastened to lens mount 40. Nonetheless, plate 41 can be attached to another component, for example, the frame (not shown) of the optical reading apparatus, provided that plate 41 is inclined at a desired angle $\theta$ to light path 25.

Further, according to the present invention, angle $\theta$ is not limited to 10°, as long as it is less than 90°.

A second embodiment of the present invention will now be described, with reference to FIG. 11.

Figure 11:
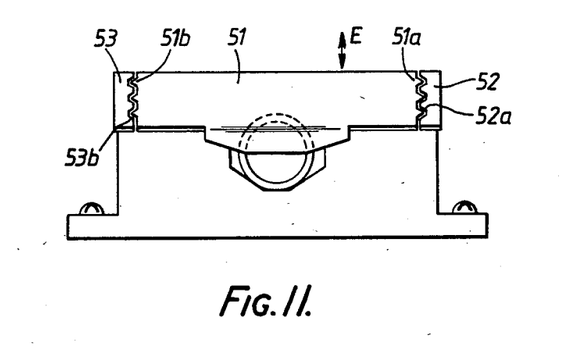
FIGS. 11 to 15 are diagrams illustrating other embodiments of the present invention.

As is shown in FIG. 11, the optical reading apparatus according to the second embodiment has a shading plate 51 and plate-holding plates 52 and 53. Shading plate 51 has projections 51a and projections 51b on the opposing two lateral surfaces, respectively. Both plates 52 and 53 are made of elastic material, each having recesses cut in one lateral surface. Plates 52 and 53 extend parallel to each other. Shading plate 51 is held between plates 52 and 53, with projections 51a loosely fitted in recesses 52a of plate 52 and projections 51b loosely fitted in recesses 53b of plate 53. Plate 51 can move up and down in the direction of arrow E (FIG. 11). Shading plate 51 is moved to a desired position, where it reduces the light to be applied to the center portion of the lens (not shown), thereby minimizing the difference in amount between the light incident on the center portion of the lens and the light incident on the peripheral portion thereof. Then, plate 51 is firmly clamped between holding plates 52 and 53, with projections 51a and 51b tightly fitted in recesses 52a and 53b.

The optical reading apparatus shown in FIG. 11 is advantageous over the apparatus illustrated in FIGS. 6 and 7 in two respects. First, no screws are required to adjust the position of shading plate 51. Secondly, since projections 51a and 51b are fitted in recesses 52a and 53b, no care needs to be taken to prevent shading plate 51 from being inclined while being moved to the desired position. Therefore, it is easy to adjust the position of plate 51.

A third embodiment of the present invention will now be described, with reference to FIG. 12.

Figure 12:
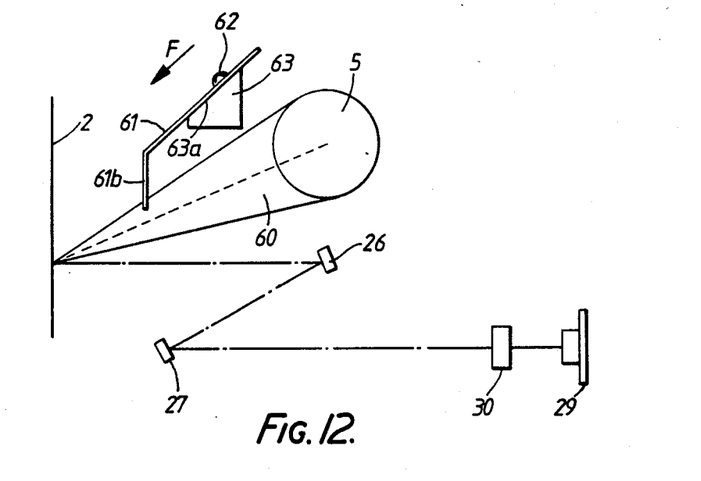
Figure 13:
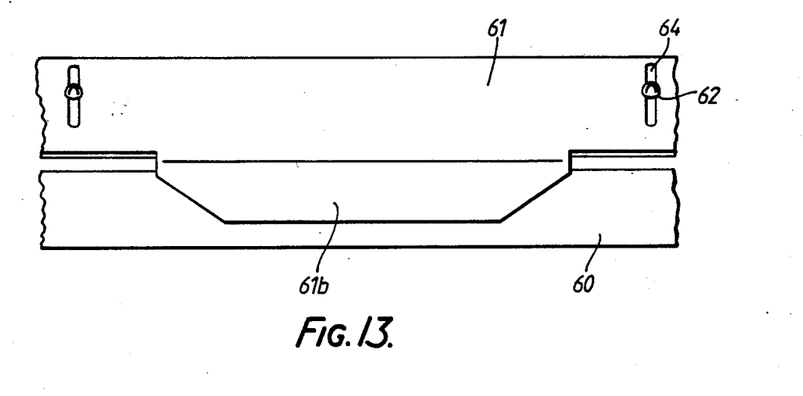

As is shown in FIG. 12, the optical reading apparatus according to the third embodiment comprises lens 30, sensor 29, shading plate 61, and support 62. Shading plate 61 consists of a long portion and vertical portion 61b. Support 63 has upper surface 63a inclined to light path 60 at an angle $\theta$, where $\theta$ is greater than 90°. The long portion of plate 61 has elongated holes 64 (FIG. 13). Plate 61 is fastened to upper surface 63a of support 63 by means of a screw 62 inserted in an elongated hole 64.

Vertical portion 61b is shaped, such that it shades the light applied from lamp 5 to sheet 2 (i.e., an original), reflected from sheet 2, also reflected by mirrors 26 and 27, and supplied toward lens 30 along light path 60, thereby to reduce the light incident on the center portion of lens 30. The light, thus shaded by shading plate 61, is supplied through lens 30 to sensor 29.

To adjust the position of shading plate 61 with respect to light path 60, it suffices to loosen screw 62, move shading plate 61 in the direction of arrow F to a desired position, and fastened screw 62, thus fastening plate 61 to support 63, in the same way as in the optical reading apparatus shown FIGS. 6. Thus, plate 61 can shade the light in the same manner as its equivalent used in the apparatus illustrated in FIG. 6. Shading plate 61 can be replaced with plate 51 which is used in the apparatus in FIG. 11. If this is the case, plate 51 is held between two holding plates identical to plates 52, 53 both shown in FIG. 11.

Figure 14:
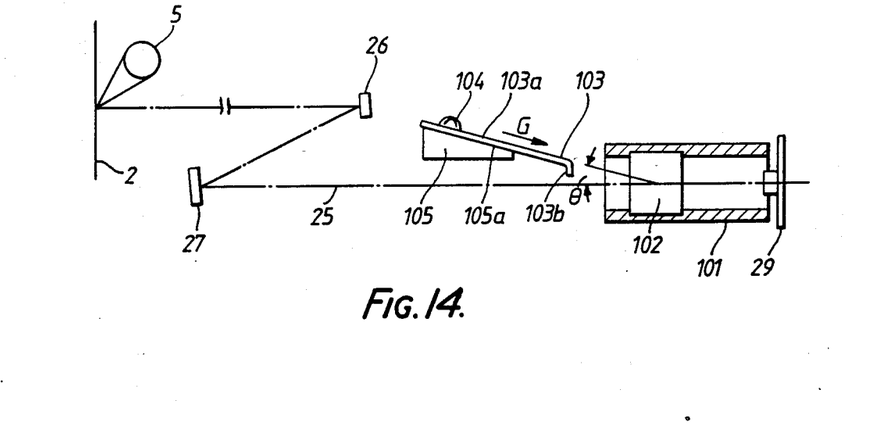

A fourth embodiment of the present invention will now be descrived, with reference to FIG. 14.

Figure 15:
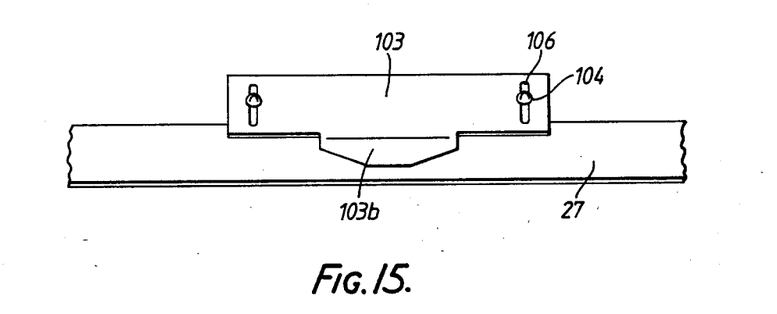

As is shown in FIG. 14, the optical reading apparatus according to the fourth embodiment comprises lens mount 101, shading plate 103, lens 102, support 105, and sensor 29, support 105 has an down surface 105a inclined at 10° to a light path 25 of the reading apparatus, shading plate 103 consists of two portions, a long portion 103a and a vertical portion 103b, the long portion 103a has elongated holes 106 (FIG. 15).

Long portion 103a is fastened to the down surface 105a of support 105 by means of a screw 104 passing through hole, and is, therefore, inclined at 10° to light path 25. Vertical portion 103b is located near light path 25 of the reading apparatus. The long portion 103a of plate 103 is, therefore, inclined at angle 10° to light path 25. Vertical portion 103b is shaped to perform shading such that the light incident on the center portion of lens 102 is reduced more than the light applied to the peripheral portion of lens 102.

Lens 102 and sensor 29 are mounted and fixed on lens mount 101. The light reflected from sheet 2 (i.e., an original) is applied to mirror 26 and reflected therefrom to mirror 27. Mirror 27 reflects and applies the light to the optical reading apparatus. In the optical reading apparatus, the light travels along light path 25 and undergoes the shading performed by vertical portion 103b of shading plate 41. The light is then applied through lens 102 onto the light-receiving surface of sensor 29.

In order to shade the light to be applied to the center portion of lens 102 more than the light to be applied to the peripheral portion of lens 102, screw 104 is first loosened. Then shading plate 103 is moved in the direction of arrow G (FIG. 14) to a desired position, and screw 104 is retightened, thus fastening plate 103 to support 105.

The longer the distance the plate is moved in the direction of arrow G, the nearer the vertical portion 103b approaches or intercepts light path 25 to shade the light. Since vertical portion 103b moves away from lens 102 toward mirror 27, the ratio of its width to the width of path 25 which converges toward lens 102 decreases.

What is claimed is:

1. An optical reading apparatus for generating image information from an object, comprising:
   a light source for emitting light along an emission path onto the object, the object reflecting the light from the light source along a reflection path;
   photo-sensitive means responsive to the reflected light for generating electrical image signals corresponding to the reflected light;
   shading means for moving along a direction at an acute angle with respect to at least one of the emission path and the reflection path for intercepting a portion of the corresponding one of the emitted light from the light source and the reflected light from the object.

2. The apparatus of claim 1 wherein the light on the reflection path includes peripheral light reflected from peripheral portions of the object, and the shading means includes a shade and support means for movably supporting the shade at an acute angle with respect to the reflection path for adjusting the amount of reflected light received by the photo-sensitive means, without interfering substantially with the peripheral light.

3. The optical reading apparatus of claim 2 wherein said support means is disposed between the photo-sensitive means and the object, and includes a surface downwardly inclined toward said photo sensitive means at an acute angle to the reflection path, said shade being slidable on the surface.

4. The optical reading apparatus of claim 2 wherein said support means is disposed between the photo sensitive means and the object, and includes a surface downwardly inclined toward said object at an acute angle to the emission path, said shade being slidable on the surface.

5. The optical reading apparatus of claim 2 wherein said shade includes elongated holes, and the support means includes screws passing through said elongated holes for fastening the shade to the support.

6. The optical reading apparatus of claim 2 wherein said shade has opposite flanks, each flank having projections thereon,
   said support means having recesses corresponding to said projections, the recesses receiving the corresponding projections for holding the shade in fixed relation to the support means.

7. The optical reading apparatus of claim 6 wherein at least one of the recesses and projections includes an elastic material.

8. The apparatus of claim 1 wherein the light traversing the emission path includes peripheral light emitted onto peripheral portions of the object, and the shading means includes a shade and support means for movably supporting the shade at an acute with respect to the emission path for adjusting the amount of emitted light received by the object without interfering substantially with the peripheral light.

9. The optical reading apparatus of claim 8 wherein said support means is disposed between the photo sensitive means and the object, and includes a surface downwardly inclined toward said photo sensitive means at an acute angle to the reflection path, said shade being slidable on the surface.

10. The optical reading apparatus of claim 8 wherein said support means is disposed between the photo sensitive means and the object, and includes a surface downwardly inclined toward said object at an acute angle to the emission path, said shade being slidable on the surface.

11. The optical reading apparatus of claim 8 wherein said shade includes elongated holes, and the support means includes screws passing through said elongated holes for fastening the shade to the support means.

12. The optical reading apparatus of claim 8 wherein said shade has opposite flanks, each flank having projections thereon,
   said support means having recesses corresponding to said projections, the recesses receiving the corresponding projections for holding the shade in fixed relation to the support means.

13. The optical reading apparatus of claim 12 wherein at least one of the recesses and projections includes elastic material.

14. In an optical reading apparatus having photo-sensitive means with central and peripheral portions, the photo-sensitive means being responsive to reflected light from an object for generating electrical image signals corresponding to the reflected light, a method of shading the light receiving by the photo-sensitive means, comprising the steps of;
   exposing the object to emitted light travelling from a light source along a predetermined emission path, the light being reflected by the object along a prescribed reflection path; and
   moving a shade to a position where the photo-sensitive means receives substantially equal amounts of reflected light at both the central and peripheral portions, the movement being along a line at an acute angle to at least one of the emission path and the reflection path for intercepting a portion of the corresponding one of the emitted light from the light source and the reflected light from the object.

15. The apparatus of claim 1, wherein said shading means includes:
   support means for adjustably supporting the shading means relative to at least one of the emission path and the reflection path, said support means having a surface disposed at an acute angle to at least one of the emission path and the reflection path;
   a long portion for engaging the surface of the support means, said long portion being fixable to said support means; and
   a vertical portion extending from said long portion in a direction substantially perpendicular to at least one of said emission path and said reflection path for intercepting a portion of the emitted light from the light source or the reflected light from the object, respectively.

16. The apparatus of claim 15 wherein said vertical portion has an edge distal said long portion extending in a direction substantially perpendicular to at least one of said emission path and said reflection path, the amount of light intercepted by said vertical portion decreases as the distance along said edge of said vertical portion from the center of the emission path and the reflection path increases.

* * * * *